United States Patent [19]

Stolz

[11] Patent Number: 4,582,505
[45] Date of Patent: Apr. 15, 1986

[54] CONNECTOR ELEMENT

[75] Inventor: Hermann Stolz, Muehlheim, Fed. Rep. of Germany

[73] Assignee: MATO Maschinen-und Metallwarenfabrik Curt Matthaei GmbH & Co. KG, Offenbach am Main, Fed. Rep. of Germany

[21] Appl. No.: 645,037

[22] Filed: Aug. 27, 1984

[30] Foreign Application Priority Data

Sep. 13, 1983 [DE] Fed. Rep. of Germany ....... 3332927

[51] Int. Cl.[4] ................................................. F16G 7/00
[52] U.S. Cl. ....................................... 474/255; 24/33 P
[58] Field of Search ...................... 474/253, 255, 257; 24/31 H, 33 P, 33 B, 33 C; 198/844, 846, 847

[56] References Cited

U.S. PATENT DOCUMENTS 1,679,303 7/1928 Fruhof ................................. 24/33 B
3,107,406 10/1963 Tebb ..................................... 24/33 C
4,315,349 2/1982 Stolz ..................................... 24/31 H

FOREIGN PATENT DOCUMENTS 1117951 11/1961 Fed. Rep. of Germany ...... 474/255
79355 1/1952 Netherlands ......................... 24/31 H
1003512 9/1965 United Kingdom ................ 24/33 B Primary Examiner—Stuart S. Levy
Assistant Examiner—Katherine Matecki
Attorney, Agent, or Firm—W. G. Fasse; D. H. Kane, Jr.

[57] ABSTRACT

The invention relates to a connector element for the belt ends of conveyor belts, which embraces the belt end with its shanks in a U-shape while forming an eye loop. The connector element has openings in its shanks for receiving staple-like securing means, as well as projections on the sides of the shanks facing each other. These projections extend perpendicularly to the longitudinal direction of the shanks, and can be pressed into the belt surface. At least two projections are arranged on each shank, one behind the other as viewed in the shank's longitudinal direction. The projections protrude sideways beyond the shanks, and their free ends form an intermeshing connection of the shanks of neighboring connector elements. These projections may extend at a right angle or at a slant across the length of the respective shank.

18 Claims, 6 Drawing Figures

CONNECTOR ELEMENT

FIELD OF THE INVENTION

The invention relates to a connector element for the belt ends of conveyor belts, which embraces the belt end with its shanks in a U-shape while forming an eye loop. The connector element comprises passing through openings in its shanks for staple-like securing means as well as projections on the sides of the shanks which face each other. These projections extend across the lengthwise direction of the shanks, and can be pressed into the belt surface.

DESCRIPTION OF THE PRIOR ART

Such a connector element for conveyor belts is known for example from the German Pat. No. 1,186,698. A plurality of such connector elements is attached next to each other with their staple-like securing means to both belt ends. Normally, the stem which forms the eye loop is somewhat narrower than the shanks. The connection of both belt ends is then achieved by means of a rod, which is pushed through the eye loops of both belt ends, after the eye loops have been put into an overlapping aligned position.

In a connector element of the described type it is already known from German Patent (DE-PS) No. 1,186,698 to arrange an elevated bump or a projection on the inner side of each shank. This bump or projection presses somewhat into the material on the belt surface, when the connector element is anchored to the belt end by means of the staple-like securing means. Therefore, a projection basically improves the holding force of the connector element. The known projection however contributes only insignificantly to this purpose, because, now as before, the arising forces are mostly taken up by the staple-like securing means. It is even a disadvantage in the known connection element, that an additional bending load arises due to the particular position of the projections, when the conveyor belt runs over a drum or guide roller.

Recently, belt webbing material with very high strength characteristics has been used for making conveyor belts. Thus, it is possible to produce belts with only one or two web plies. Such thin conveyor belts, however, are exceptionally sensitive to the staple-like securing means.

OBJECTS OF THE INVENTION

It is the object of the invention to increase the dynamic loadability of the conveyor belt connector comprising a plurality of connector elements. In such a connector the forces normally arising during operation are no longer to be transmitted mainly by the penetrating means, for example staple-like securing elements or screws. Instead, these forces are mainly transmitted as clamping and shearing forces acting on the outside of the conveyor belt. Simultaneously, the number of belt fibers previously struck by the staple-like securing means, shall be considerably reduced.

SUMMARY OF THE INVENTION

According to the invention there is provided a belt connector element comprising at least two projections arranged on each shank behind one another in the shank lengthwise direction. These projections protrude sideways beyond the shank and their free ends form an intermeshing of the shanks of neighboring connector elements.

In such a construction the staple-like securing means serve primarily for applying and maintaining clamping forces. The loads arising in operation are thus transmitted practically only as clamping or shearing forces. The additional holding force of the staple-like securing means is only of importance when overloads occur occasionally.

Furthermore, the invention provides, that the clamping action in the connector element increases stepwise toward its eye loop. In order to achieve this, preferably projections with varying cross-sections are provided whereby the cross-section of the projections decreases toward the end of the shank.

Further features of the invention appear from the dependent claims and the specification in conjunction with the drawings.

BRIEF DESCRIPTION OF THE FIGURES

In order that the invention may be clearly understood, it will now be described, by way of example, with reference to the accompanying drawings, wherein.

Figure 1:
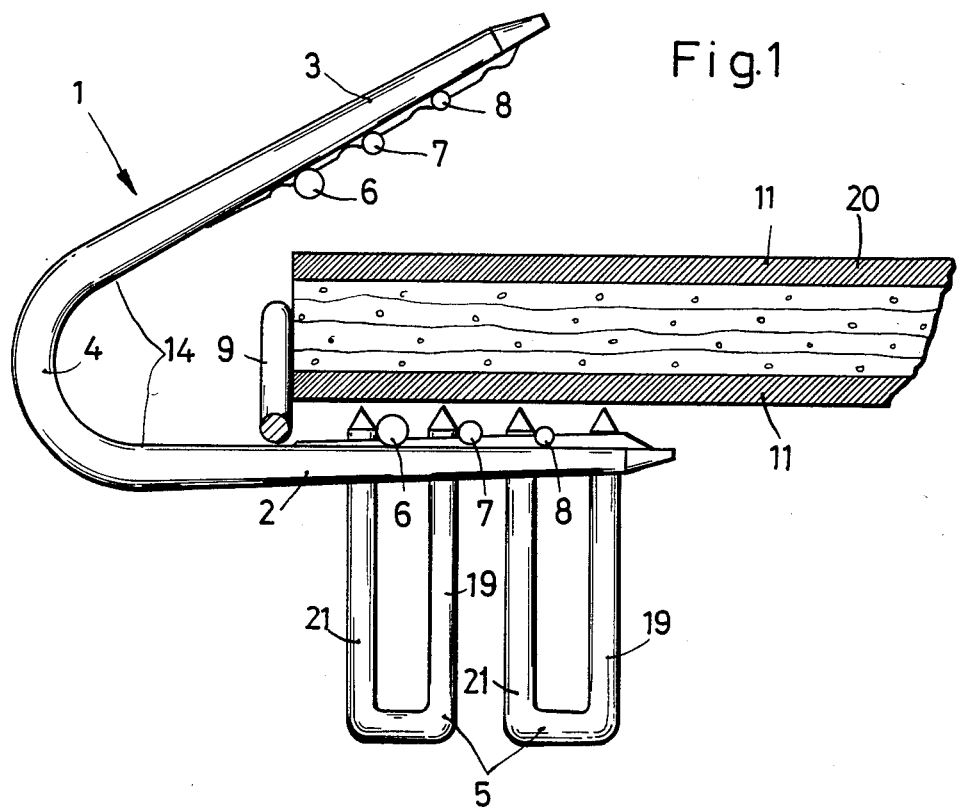
FIG. 1 is a side view of a connector element on a larger scale, before securing to the belt end.

DETAILED DESCRIPTION OF PREFERRED EXAMPLE EMBODIMENTS AND OF THE BEST MODE OF THE INVENTION

A connector element 1 for a conveyor belt or a belt 20 comprises two shanks 2 and 3 interconnected by an intermediate section forming an eye loop 4, after the securing of the connector element 1 to the conveyor belt 20. This securing or anchoring is achieved by staple-like securing means 5. The eye loop 4 allows a rod to be passed through it, for a later connection of the two belt ends to each other.

Figure 5:
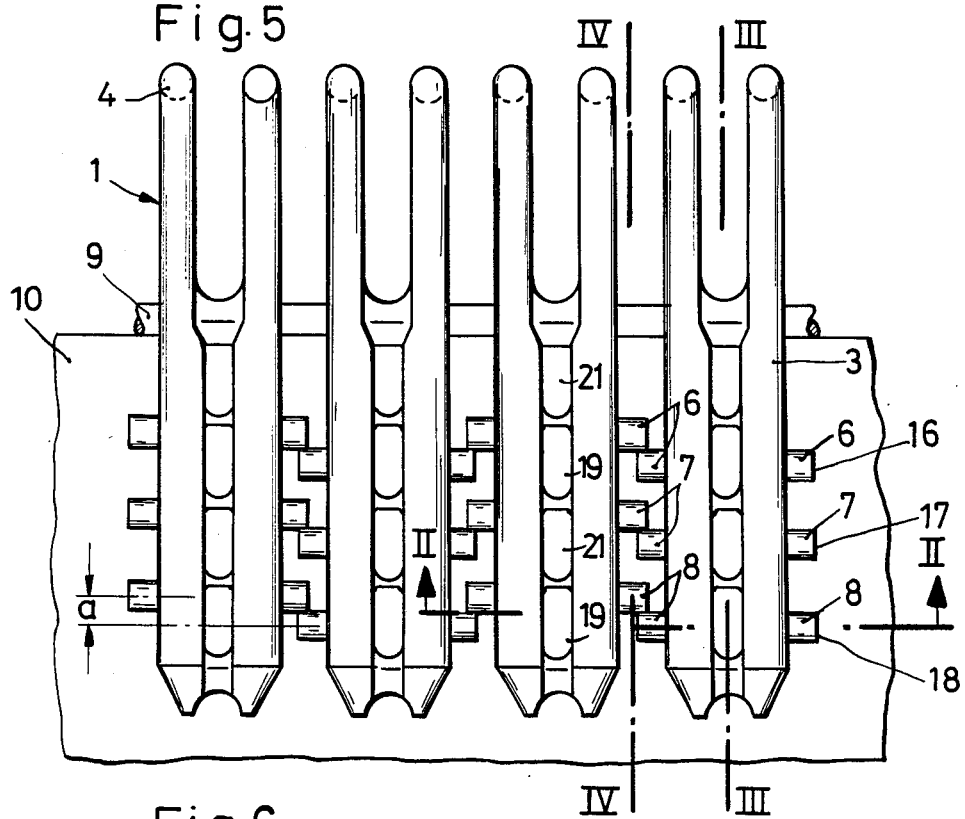
FIG. 5 is a top plan view onto several connector elements arranged next to one another on a belt end.
Figure 6:
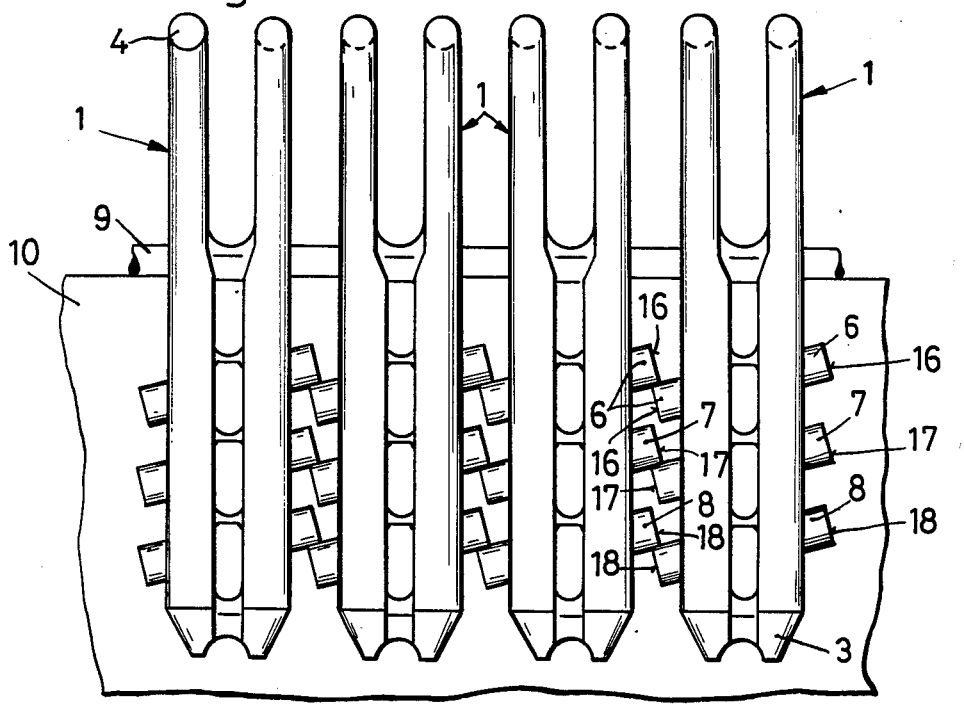
FIG. 6 is a top plan view, as in FIG. 5, of a modified embodiment.

On the sides facing each other, or rather on the inner surfaces 14, both shanks 2 or 3 are provided with projections 6, 7 and 8. Preferably, these projections are rod shaped, or rather, they are in the form of round rods or bars. These projections 6, 7, and 8 protrude sideways with free ends 16, 17, or 18 beyond the shanks 2, 3. Thus, they may be longer than the shanks 2, 3 are wide. These protruding free ends may be rod or bar sections as best seen in FIGS. 5 and 6. The protruding ends 16, 17 or 18 of the rod-shaped projections 6, 7 or 8 form an intermeshing between neighboring connector elements 1, as best seen in FIGS. 5 and 6. For this purpose the connector elements 1 are anchored a small distance apart by the staple-like securing members 5 having legs 19, 21 spaced so that the ends 16, 17 or 18 of the projections of one shank 2 or 3 respectively lie in the gaps between the ends 16, 17 or 18 of the projection of the other shank 2 or 3 of another connection element 1 (FIG. 5 or FIG. 6).

In the example embodiment shown in FIG. 5, the rod shaped projections 6, 7 or 8 are arranged on the shanks 2, 3 perpendicular to the longitudinal axis of the shank. An intermeshing is thereby achieved in that the projections 6, 7, 8 of neighboring connector elements 1 are slightly displaced by the distance "a" in FIG. 5.

In the example embodiment shown in FIG. 6 the rod-shaped projections 6, 7 or 8 lie at an angle to the longitudinal axis of the shanks 2, 3 or to the lengthwise axis of the connector element 1. Here again the ends 16, 17 or 18 of the rod-shaped projections 6, 7 or 8 of neighboring connector elements 1 are intermeshed in the assembled state. Due to the slanted or angled arrangement, it may not be necessary that the projections of neighboring connector elements 1 must be displaced from each other by the spacing "a" as shown in FIG. 5.

In both embodiments the intermeshing acts as a third element for increasing the dynamic loadability or strength of the connection. Due to the intermeshing connection, a force transmission parallel to the belt end 10 is achieved, whereby the flexibility of the conveyor belt 20 or rather its capacity to form a trough is retained.

Figure 3:
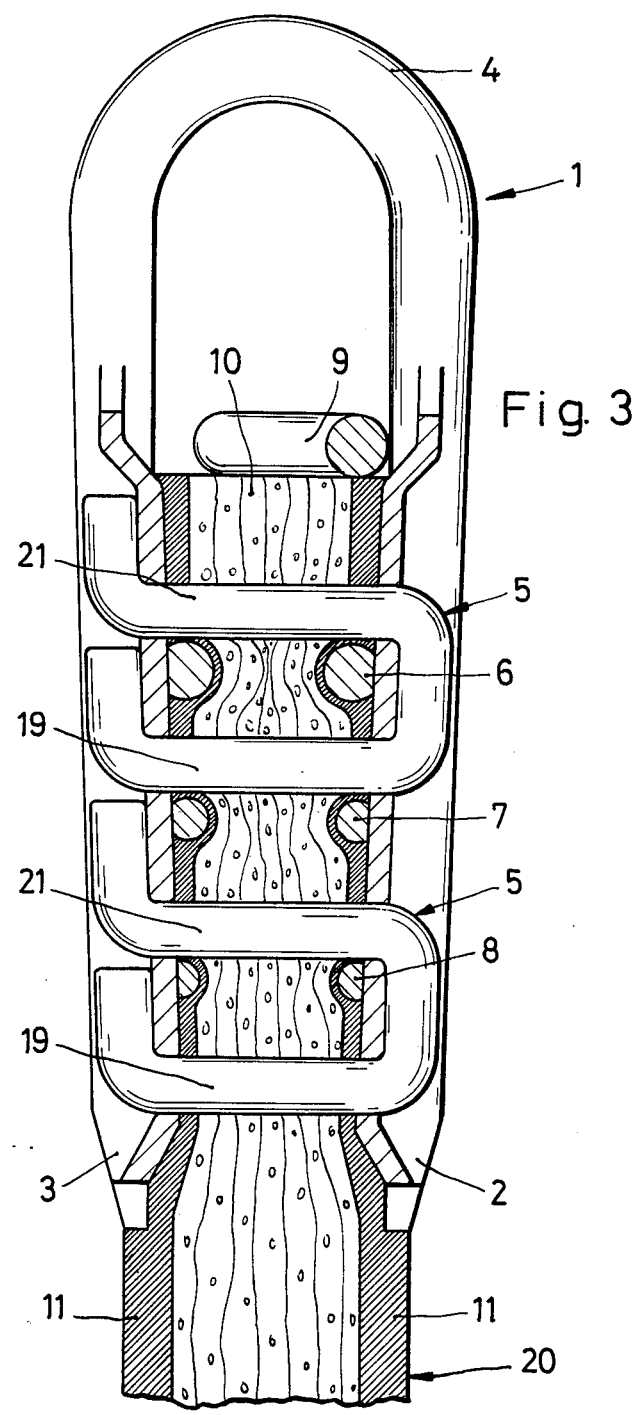
FIG. 3 is a section along the line III—III in FIG. 5.
Figure 4:
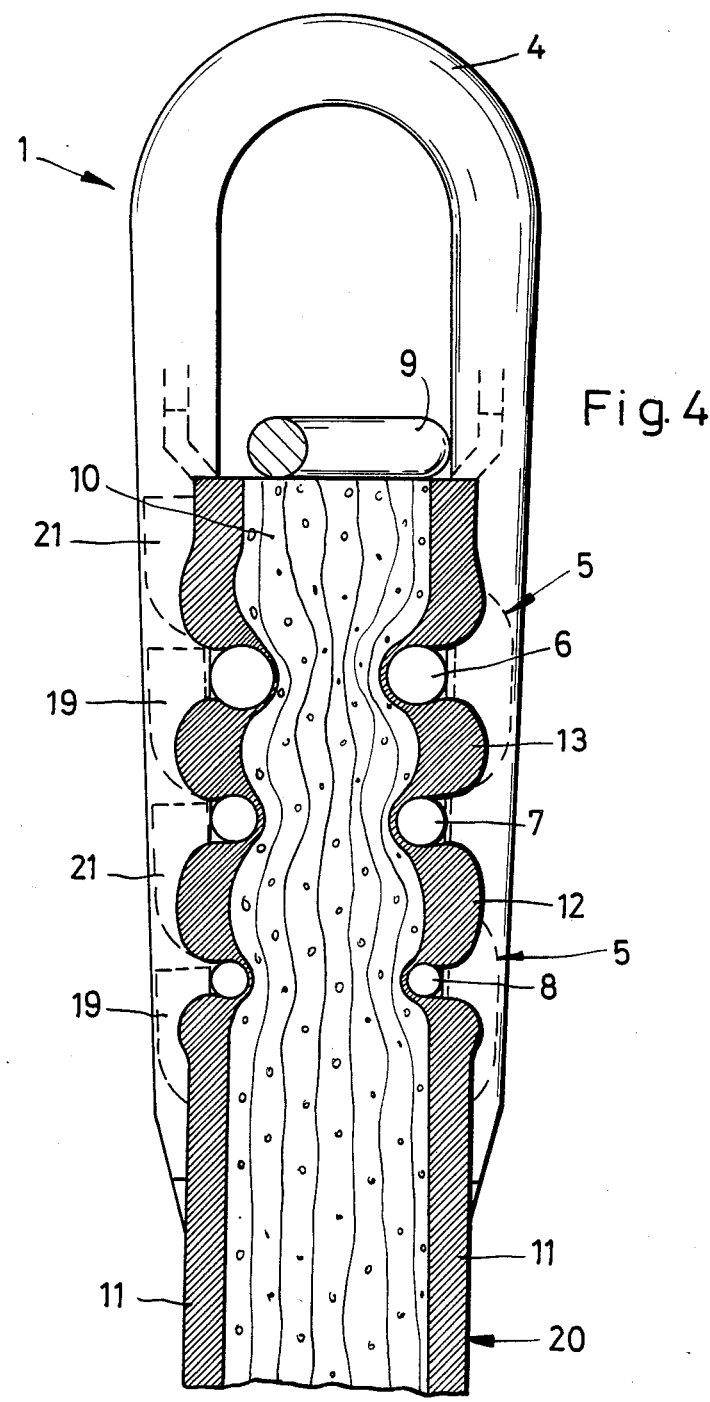
FIG. 4 is a section along the line IV—IV in FIG. 5.

As shown in FIGS. 3 and 4, the penetration depth of the projections 6, 7 or 8 into the conveyor belt 20 is varied, and preferably increases toward the belt end 10. For this purpose the rod-shaped projections 6, 7 or 8 have different cross-sections, whereby the projections 6 with the largest cross-section lie in the area of the belt end 10, whereas the projections 8 with the smallest cross-section are arranged near the free end of the shanks 2, 3. By these features it is achieved, that the bending tensions in the conveyor belt or the belt 20 reach only small tension peaks in the clamping area while the belt 20 is running around drums or other guide points.

Further, several connector elements 1 are, for example, held together in a manner known as such by a waved crosswire 9 before their securing to the conveyor belt 20.

As shown in FIG. 4, segmens 12, 13 are formed in the cover plates 11 of the conveyor belt 20 due to the penetration or indentation of the projections 6, 7 or 8 into these cover plates 11. The segments 12, 13 also take part effectively in the force transmission when special tension loads arise.

Figure 2:
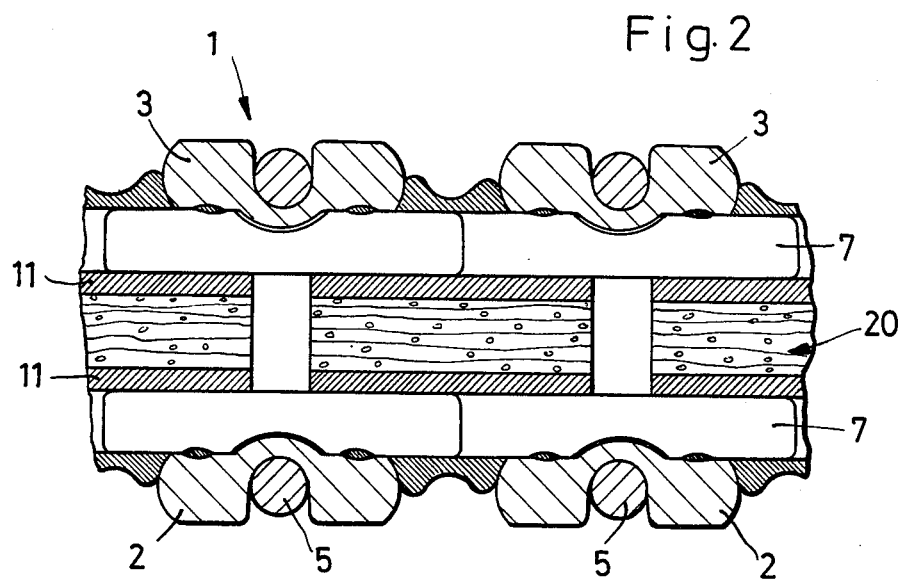
FIG. 2 is a section along the line II—II in FIG. 5.

Since the staple-like securing means 5 mainly serve for causing and maintaining clamping and shearing forces, the spacing between the staple legs 19, 21 (FIG. 1 and FIG. 3) may be relatively small. Therefore, it is further possible to arrange several stape-like securing members 5 behind one another or even to arrange such securing members 5 in a single row, as shown in FIGS. 2 as well as 5 and 6. The position and arrangement of the securing members 5 with their legs 19, 21 is chosen so that the projections 6, 7 or 8 lie between the legs 19, 21, or rather in a plane passing between the staple legs 19, 21 as shown in FIGS. 1 and 3 or 4. Especially, the projection 6 adjacent to the belt end 10 and the projection 8 lying the furthest away from the belt end 10, each lie in a plane passing between the respective staple legs 19, 21 of a staple-like securing members 5. This feature has an advantageous effect on the clamping forces to be transmitted.

By using connector elements 1 with intermeshing parts 6, 7 or 8 it is possible to provide considerably fewer connector elements for a complete conveyor belt connection than was previously the case. Furthermore, a much larger number of staple-like securing members was previously required. In addition, with connector elements 1 of the invention a ten- to twenty-fold load alternation improvement has been achieved, compared to customary connector elements. This improvement depends upon the use of the projections 6, 7, 8 with their ends 16, 17, 18 which protrude beyond the shanks 2, 3, and upon the intermeshing of the projections 6, 7, 8 and their ends 16, 17, 18 with the conveyor belt 20 as well as upon the intermeshing of the connector elements 1 with one another. The connector elements 1 form clampinag bands running over the total belt width and act on the belt surface by transmitting the arising loads through clamping and shearing forces to the top and bottom sides of the conveyor belt 20.

Although the invention has been described with reference to specific example embodiments, it will be appreciated, that it is intended to cover all modifications and equivalents with the scope of the appended claims.

What is claimed is:

1. A connector element for interconnecting the ends of a belt to each other, said belt having a certain belt width, said connector element comprising shank means having a given shank width in the direction of said belt width, said shank means further having first shank sides facing said belt and second shank sides facing in the direction of said belt width, eye loop means interconnecting said shank means for embracing a belt end by the shank means with the eye loop means extending around a belt end edge, at least one staple-like securing member having two legs, openings in said shank means through which said two legs of said staple-like securing member extend, at least two projection means on each of said first shank sides facing said belt, said projection means having free projection ends protruding laterally outside said second shank sides facing in the direction of said belt width, and wherein at least one of said projection means is located in a plane passing between said two legs of said staple-like securing member.

2. The connector element of claim 1, wherein said projection means comprise crossbars including a first crossbar adjacent to said belt end edge, said first crossbar forming said one projection means located in said plane passing between said two legs of the respective staple-like securing member, said crossbars having a length larger than said shank width to provide said free projection ends protruding laterally from said shank means.

3. The connector element of claim 1, wherein said projection means comprise crossbars including a first crossbar adjacent to said belt end edge and a second crossbar remote from said belt end edge, said second crossbar forming said one projection means located in said plane passing between said two legs of the respective staple-like securing member.

4. The connector element of claim 1, wherein said projection means are crossbars comprising more than two crossbars.

5. The connector element of claim 1, wherein said projection means comprise crossbars extending in parallel to each other, and wherein the crossbars attached to one shank means are located opposite the crossbars attached to the other shank means of a connector element.

6. The connector element of claim 1, wherein said projection means comprise crossbars extending perpendicularly to the length of said shank means and in parallel to the direction of said shank width.

7. The connector element of claim 1, wherein said projection means comprise crossbars extending at a slant relative to the length of said shank means and in a plane defined by the respective shank means.

8. The connector element of claim 1, wherein said projection means have different diameters or different cross-sections.

9. The connector element of claim 8, wherein said projection means comprise crossbars including a crossbar adjacent to said belt end edge having the largest diameter or cross-section, and further away from said belt end edge crossbars having progressingly smaller diameters or cross-sections.

10. The connector element of claim 1, comprising more than one of said staple-like securing members which are arranged in a row in the longitudinal direction of said shank means.

11. The connector element of claim 1, wherein said two legs of each of said staple-like securing members have a relatively small spacing from each other.

12. The connector element of claim 1, wherein said projection means have a circular cross-section at least at said free ends thereof.

13. The connector element of claim 1, wherein said projection means are rod sections which protrude laterally outside the respective shank side.

14. A belt connector, especially for interconnecting the belt ends of a conveyor belt to each other, said conveyor belt having a certain belt width, comprising a plurality of connector elements, each of said connector elements comprising shank means having a given shank width in the direction of said belt width, said shank means further having first shank sides facing said belt and second shank sides facing in the direction of said belt width, eye loop means interconnecting said shank means for embracing a belt end by the shank means with the eye loop means extending around a belt end edge, at least one staple-like securing member for each connector element, each staple-like securing member having two legs, openings in said shank means through which said two legs of said staple-like securing member extend, at least two projection means on each of said first shank sides facing said belt, said projection means having free projection ends protruding laterally outside said second shank sides facing in the direction of said belt width, whereby said free projection ends of neighboring connector elements are adapted for intermeshing with each other, said free projection ends of said connector elements forming clamping bands adapted for being pressed into said conveyor belt by said staple-like securing members with such a strength that normal operating stresses are transmitted primarily by the clamping and shearing forces caused by said projection means pressed into the upper and lower surface of said conveyor belt, and wherein at least one of said projection means is located in a plane passing between said two legs of the respective staple-like securing member.

15. The belt connector of claim 14, wherein said projection means comprise crossbars staggered from one connector element to the next.

16. The belt connector of claim 14, wherein said projection means comprise crossbars slanted relative to the length of the respective shank means.

17. The belt connector of claim 14, wherein said projection means are rod sections which protrude laterally outside the respective shank side.

18. The belt connector of claim 14, wherein two neighboring connector elements are so closely spaced from each other, that said free projection ends of said neighboring connector elements protruding toward each other also intermesh with each other.

* * * * *